US011054329B2

(12) United States Patent
MacNeil et al.

(10) Patent No.: US 11,054,329 B2
(45) Date of Patent: Jul. 6, 2021

(54) ELECTRONIC DEVICES HAVING PRESSURE SENSORS WITH HEATERS

(71) Applicant: Apple Inc., Cupertino, CA (US)

(72) Inventors: David MacNeil, Cupertino, CA (US); Gregory B. Arndt, San Jose, CA (US); Roberto M. Ribeiro, San Jose, CA (US); William E. Mickelson, Albany, CA (US); Richard Yeh, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 288 days.

(21) Appl. No.: 16/012,700

(22) Filed: Jun. 19, 2018

(65) Prior Publication Data

US 2019/0086284 A1     Mar. 21, 2019

Related U.S. Application Data

(60) Provisional application No. 62/560,119, filed on Sep. 18, 2017.

(51) Int. Cl.
| G01L 27/00 | (2006.01) |
| G01L 9/02 | (2006.01) |
| G01L 19/04 | (2006.01) |
| G01K 1/20 | (2006.01) |
| G01K 13/00 | (2021.01) |

(52) U.S. Cl.
CPC .............. *G01L 27/002* (2013.01); *G01K 1/20* (2013.01); *G01K 13/00* (2013.01); *G01L 9/025* (2013.01); *G01L 19/04* (2013.01)

(58) Field of Classification Search
CPC ....... G01L 27/002; G01L 19/04; G01L 9/025; G01K 13/00; G01K 1/20
See application file for complete search history.

(56) References Cited

U.S. PATENT DOCUMENTS

| 7,258,015 B1* | 8/2007 | Shaw ........................ G01B 5/30 73/708 |
| 9,939,338 B2* | 4/2018 | Pagani ....................... G01L 1/18 |
| 2015/0369682 A1* | 12/2015 | Nakajima ............. G01L 9/0054 73/384 |
| 2016/0069679 A1* | 3/2016 | Jackson ............... G01C 22/006 702/160 |
| 2017/0284919 A1* | 10/2017 | Slater ..................... G01N 11/08 |

* cited by examiner

*Primary Examiner* — Suman K Nath
(74) *Attorney, Agent, or Firm* — Morgan, Lewis & Bockius LLP

(57) ABSTRACT

Aspects of the subject technology relate to electronic devices with pressure sensors. A pressure sensor in a portable electronic device may include an integrated heater or may be co-operated with an external heater for the pressure sensor. The heater may be operated to heat some or all of the pressure sensor for pressure sensor testing, calibration, or temperature-controlled pressure sensing operations.

25 Claims, 12 Drawing Sheets

ELECTRONIC DEVICES HAVING PRESSURE SENSORS WITH HEATERS

CROSS-REFERENCE TO RELATED APPLICATIONS

The present application claims the benefit of U.S. Provisional Patent Application Ser. No. 62/560,119, entitled "ELECTRONIC DEVICES HAVING PRESSURE SENSORS WITH HEATERS" filed on Sep. 18, 2017, which is hereby incorporated by reference in its entirety for all purposes.

TECHNICAL FIELD

The present description relates generally to portable electronic devices, and more particularly, but not exclusively, to portable electronic devices with pressure sensors.

BACKGROUND

Electronic pressure sensors are often used to obtain barometric pressure measurements for elevation and/or weather measurements. However, challenges can arise when attempting to test, calibrate, and/or operate an electronic pressure sensor in a portable electronic device that can be carried among different locations and environments.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Portable electronic devices such as a mobile phones, portable music players, smart watches, and tablet computers are provided that include a pressure sensor for sensing changes in environmental pressure. The pressure sensor is sometimes used for barometric pressure measurements, which can be used to identify changes in elevation. The changes in elevation are sometimes used to identify a location or exercise performed by a user of the device (e.g., by an activity monitor application running on processing circuitry of the device when the device is worn or carried by the user while the user walks or runs up a flight of stairs or up a hill).

Various types of electronic sensors such as various types of electronic pressure sensors are affected by the temperature of the environment in which they operate. This can sometimes be problematic in portable electronic devices that are often carried or worn by a user through environments of differing temperature during operation and throughout the lifetime of the device. For example, in some circumstances, a rapid change in temperature (e.g., when the user carries or wears the device from inside a warm building to a cold outdoor environment) can cause a change in the pressure data from the pressure sensor that be mistaken for a change in elevation. As another example, changes in the device such as buildup of environmental aggressors (e.g., dust or oils) on the pressure sensor can change the behavior of the sensor relative to a factory calibration performed during manufacturing.

In accordance with various aspects of the subject disclosure, a portable electronic device is provided that includes a pressure sensor and an associated heater. The heater associated with a particular pressure sensor may be integrated with or formed in a common package with the pressure sensor or can be an external heater. An external heater may be operated by the pressure sensor circuitry or the pressure sensor and the external heater can be operated by external processing circuitry such as system circuitry for the device.

Figure 1A:
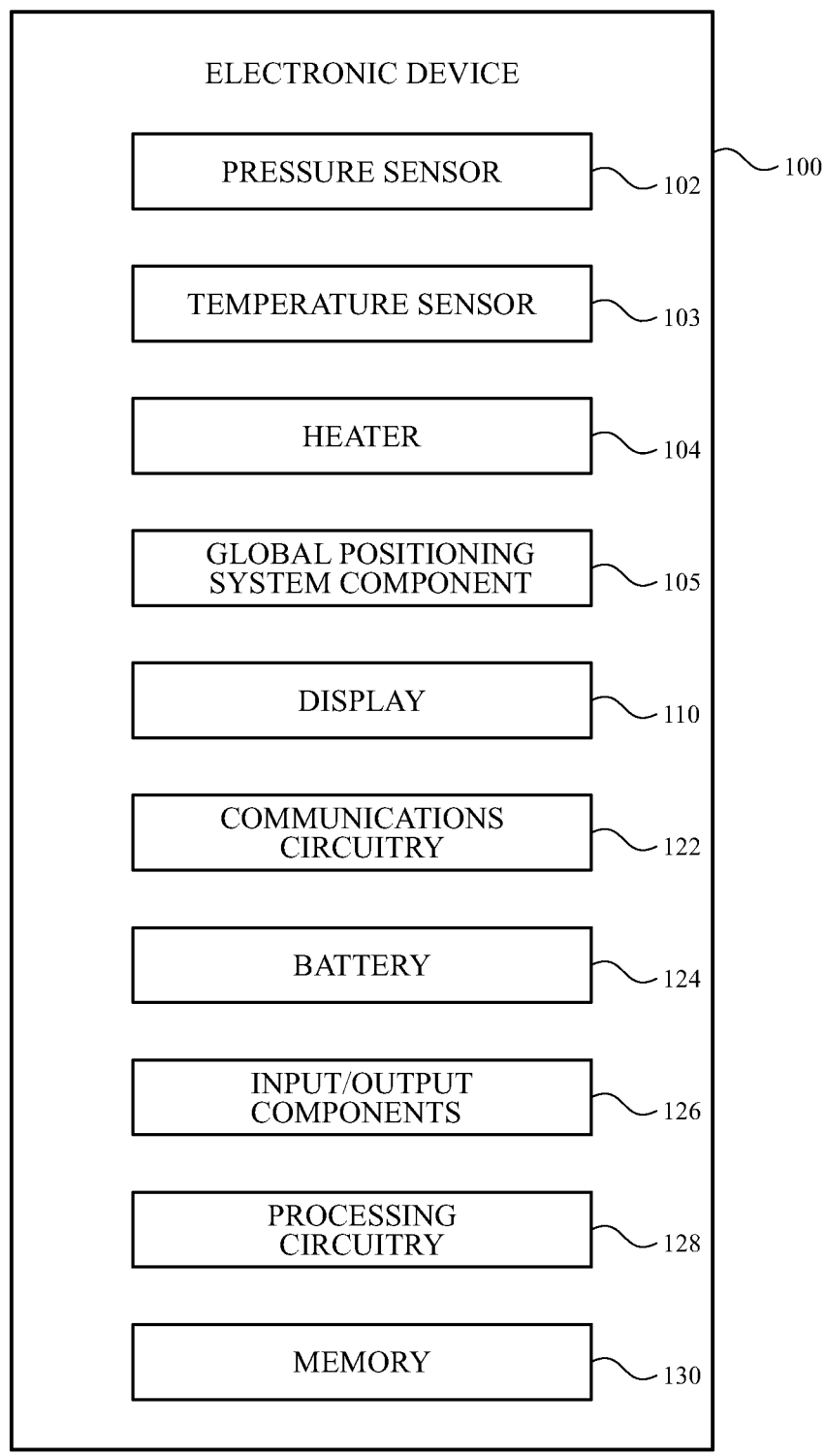
FIG. 1A illustrates a schematic diagram of an electronic device having a pressure sensor in accordance with various aspects of the subject technology.

A schematic block diagram of an illustrative electronic device with a pressure sensor is shown in FIG. 1A. In the example of FIG. 1A, device 100 includes pressure sensor 102 and heater 104. Pressure sensor 102 includes a pressure sensing element (e.g., a MEMS element, a piezo element, a membrane coupled to a capacitive or resistive transducer circuit, etc.) and may include processing circuitry for the pressure sensor. Heater 104 may be a resistive heating element or any other heating component that can be disposed on or embedded within silicon, ceramic, metal, or printed circuit board materials for heating pressure sensor 102. Device 100 also includes temperature sensor 103. Temperature sensor 103 may be integrally formed with pressure sensor 102 and arranged to sense the temperature of a pressure sensing element of pressure sensor 102.

Device 100 also includes processing circuitry 128 and memory 130. Memory 130 may include one or more different types of storage such as hard disk drive storage, nonvolatile memory (e.g., flash memory or other electrically-programmable-read-only memory), volatile memory (e.g., static or dynamic random-access-memory), magnetic or optical storage, permanent or removable storage and/or other non-transitory storage media configure to store static data, dynamic data, and/or computer readable instructions for processing circuitry 128. Processing circuitry 128 may be used in controlling the operation of device 100. Processing circuitry 128 may sometimes be referred to as system circuitry or a system-on-chip (SOC) for device 100.

Processing circuitry 128 may include a processor such as a microprocessor and other suitable integrated circuits, multi-core processors, one or more application specific integrated circuits (ASICs) or field programmable gate arrays (FPGAs) that execute sequences of instructions or code, as examples. In one suitable arrangement, processing circuitry 128 may be used to run software for device 100, such as activity monitoring applications, pressure sensing applications, sensor heating applications, sensor testing applications, sensor temperature control operations, sensor calibration applications, internet browsing applications, email applications, media playback applications, operating system functions, software for capturing and processing images, software implementing functions associated with gathering and processing sensor data, and/or software that controls audio, visual, and/or haptic functions.

In the example of FIG. 1A, device 100 also includes display 110, communications circuitry 122, battery 124, and input/output components 126. Input/output components 126 may include a touch-sensitive layer of display 110, a keyboard, a touch-pad, and/or one or more real or virtual buttons. Input/output components 126 may also include audio components such as one or more speakers and/or one or more microphones. Heater 104 may be operated by processing circuitry 128 or by processing circuitry of pressure sensor 102 for pressure sensor testing, calibration, and/or temperature control operations.

Communications circuitry 122 may be implemented using WiFi, near field communications (NFC), Bluetooth®, radio, microwave, and/or other wireless and/or wired communications circuitry. Communications circuitry 122 may be operated by processing circuitry 128 based on instructions stored in memory 130 to perform cellular telephone, network data, or other communications operations for device 100. Communications circuitry 122 may include WiFi and/or NFC communications circuitry operable to communicate with an external device such as a mobile telephone or other remote computing device. In some scenarios, data communications with an external device such as communications by circuitry 122 of a smart watch with a host mobile phone may allow the use of data from the external device to support pressure sensor testing, calibration, and/or temperature control operations (e.g., to provide a pressure reference during and/or to identify a time when device 100 is not moving for pressure sensor testing or calibration operations).

As shown in FIG. 1A, device 100 may include other components such as a global positioning system (GPS) component 105 and/or haptic components (e.g., one or more vibratory or other actuable devices that can produce tactile responses for a user and/or other desired accelerations of device 100). Although not explicitly shown, device 100 may include other sensors such as an ambient light sensor and/or a proximity sensor.

Figure 1B:
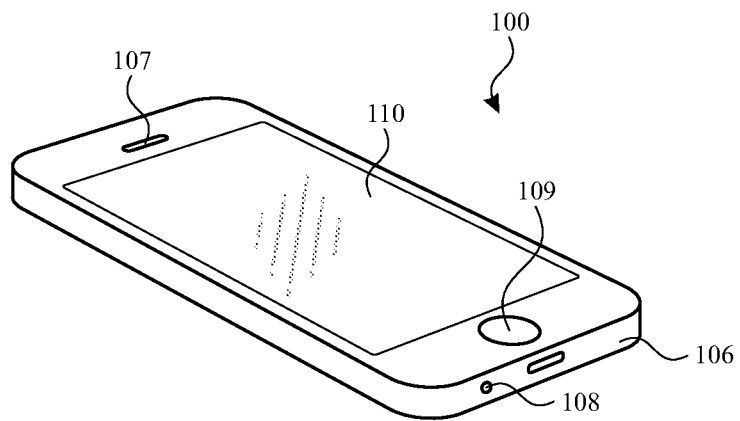
FIG. 1B illustrates a perspective view of an electronic device having a pressure sensor and implemented in the form of a handheld device in accordance with various aspects of the subject technology.

Pressure sensor 102 may be disposed within a housing of device 100 at or near an opening in the housing that allows ambient air and pressure to pass through the housing to the sensor. In the example of FIG. 1B, device 100 has been implemented using a housing 106 that is sufficiently small to fit within a user's hand (e.g., device 100 of FIG. 1 may be a handheld electronic device such as a cellular telephone). As shown in FIG. 1B, device 100 may include a display such as display 110 mounted on the front of housing 106. Display 110 may have openings (e.g., openings in the inactive or active portions of display 110) such as an opening to accommodate button 109 and an opening to accommodate speaker port 107.

Housing 106, which may sometimes be referred to as a case, may be formed of plastic, glass, ceramics, fiber composites, metal (e.g., stainless steel, aluminum, etc.), other suitable materials, or a combination of any two or more of these materials. Housing 106 may include one or more openings such as opening 108. In the example of FIG. 1B, opening 108 is formed in a sidewall of housing 106 and provides a fluid coupling for airflow between an environment external to housing 106 into a portion of housing 106. Pressure sensor 102 may be mounted internal to housing 106 adjacent to opening 108 to receive airflow from the external environment through opening 108.

The configuration of electronic device 100 of FIG. 1B is merely illustrative. In other implementations, electronic device 100 may be a laptop computer, a tablet computer, a somewhat smaller portable device such as a wrist-watch device, pendant device, or other wearable or miniature device, a media player, a gaming device, a navigation device, a fitness device, or other electronic equipment.

Figure 1C:
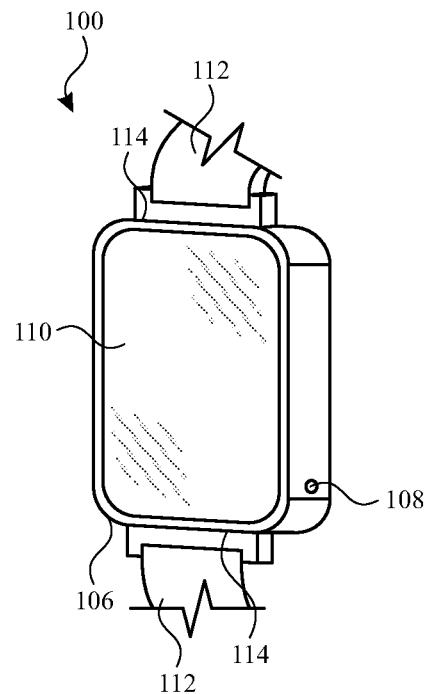
FIG. 1C illustrates a perspective view of an electronic device having a pressure sensor and implemented in the form of a smart watch in accordance with various aspects of the subject technology.

For example, FIG. 1C is a perspective view of electronic device 100 in a configuration in which electronic device 100 has been implemented in the form of a wearable device such as a smart watch that includes an opening 108 in a housing 106. As shown, in a smart watch implementation, strap 112 may be coupled to housing 106 at interfaces 114 and arranged to secure device 100 to a part of a user's body such as around the user's wrist.

Figure 2:
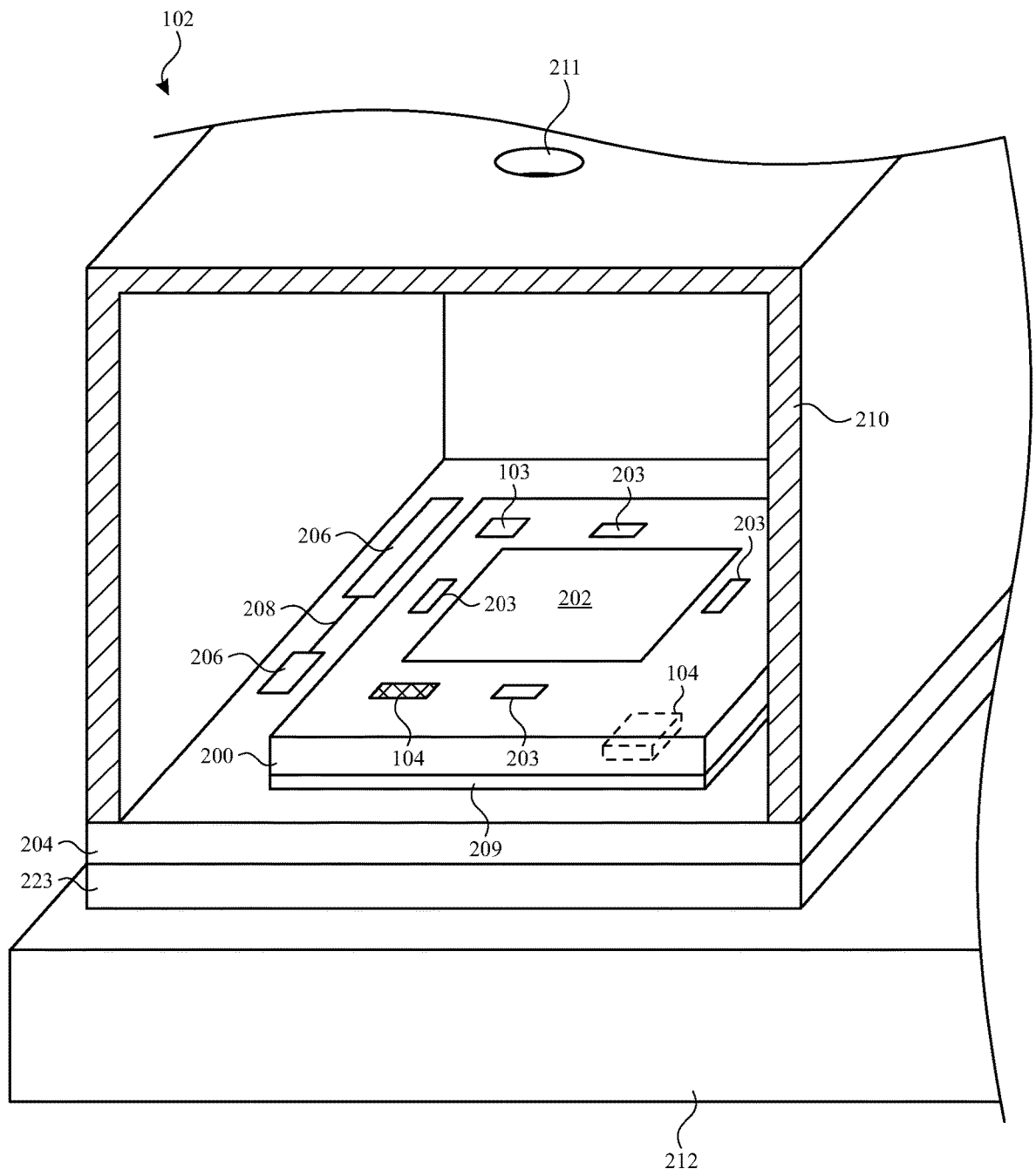
FIG. 2 illustrates a perspective view of a pressure sensor having an integrated heater in accordance with various aspects of the subject technology.

FIG. 2 is a perspective view of an exemplary implementation of pressure sensor 102. As shown in FIG. 2, pressure sensor 102 includes a pressure sensing element 200, which includes pressure sensing membrane 202. Pressure sensing element 200 may, for example, be a semiconductor die such as a silicon die having sensing elements 203 that sense deformations of pressure sensing membrane 202 due to changes in pressure at the membrane.

In one example, sensing elements 203 may be resistive elements in a silicon die for which the resistance changes in a detectable manner due to deformations of the silicon (e.g., due to deformation of membrane 202). Temperature sensor 103 may be formed on or within die 200. Temperature sensor 103 may be a thermistor or other temperature sensor that senses the temperature of die 200.

As shown in FIG. 2, in some implementations, die 200 may include one or more heating elements 104 formed on the surface of the die or embedded within the die. Heating elements 104 may, for example, be resistive elements that generate heat to be transferred to die 200.

Pressure sensor 102 may include sensor processing circuity that processes pressure sensor data based on changes in sensing elements 203, temperature sensor data from temperature sensor 103, and/or may control operation of heating elements 104. The processing circuitry may be formed on or within a sensor circuitry substrate 204. Substrate 204 may be a pressure sensor application specific integrated circuit (ASIC) that includes one or more integrated circuit elements 206. Integrated circuit elements 206 can include processing and/or storage elements and may be coupled by traces 208 on or within the sensor circuitry substrate to each other and/or to sensing elements 203, temperature sensor 103, and heating elements 104.

Circuit elements 206 may perform some or all of the processing for pressure sensor 102 and may be communicatively coupled to processing circuitry 128 of device 100 via printed circuit 212 (e.g., a rigid or flexible printed circuit that communicatively couples sensor 102 to processing circuitry 128 and memory 130). Circuit elements 206 may perform testing, calibration, and/or pressure sensing operating for pressure sensing element 200 during manufacturing and/or during normal operation (e.g., by a user) of device 100.

As shown in FIG. 2, pressure sensor 102 may include a housing 210 (e.g., a housing formed from metal, plastic, ceramic, and/or substrate materials such as a ceramic lid or a silicone cap die) having a port 211 through which ambient air can pass to pressure sensing membrane 202. Housing 210 may be a separate housing for pressure sensor 102 or may be partially or completely formed from a portion of an overall housing (e.g., housing 106) for device 100. Housing 210 may provide a relatively small volume of air over sensing membrane 202 for faster pressure equalization and measurement accuracy. Port 211 may be an implementation of opening 108 in housing 106 or port 211 may be aligned with opening 108 to allow airflow from the environment external to device 100 to pressure sensor 102 through opening 108 and port 211.

Sensor 102 may include an additional substrate 223. Substrate 223 may be a ceramic substrate (for example). Substrate 223 may be a support structure for sensor 102 and may form a portion of housing 210.

Sensor 102 may also include an insulating layer 209 that thermally insulates the heated sensor die 200 from other components of the sensor such as sensor substrates 204 and/or 223, and/or housing 210. Sensing elements 203, temperature sensor 103, and/or heating elements 104 may communicatively coupled to circuit elements 206 via contacts (not shown) that pass through insulating layer 209, if an insulating layer is provided.

It should be appreciated that the arrangement of sensor 102 shown in FIG. 2 is merely illustrative and other arrangements are contemplated. For example, sensor circuitry substrate 204 may be formed next to or otherwise separate from pressure sensing element 200 and/or support substrate 223. As another example, sensing elements 203 may be capacitive, MEMS-based, piezoelectric, or other elements that sense deformations caused by pressure changes. In some implementations, sensor housing 210 may be omitted. Integrated circuit elements 206 of pressure sensor 102 may operate heating elements 104 that are disposed on or within pressure sensing element 200 for sensor testing, sensor calibration, or other pressure sensor operations as described in further detail hereinafter.

Figure 3A:
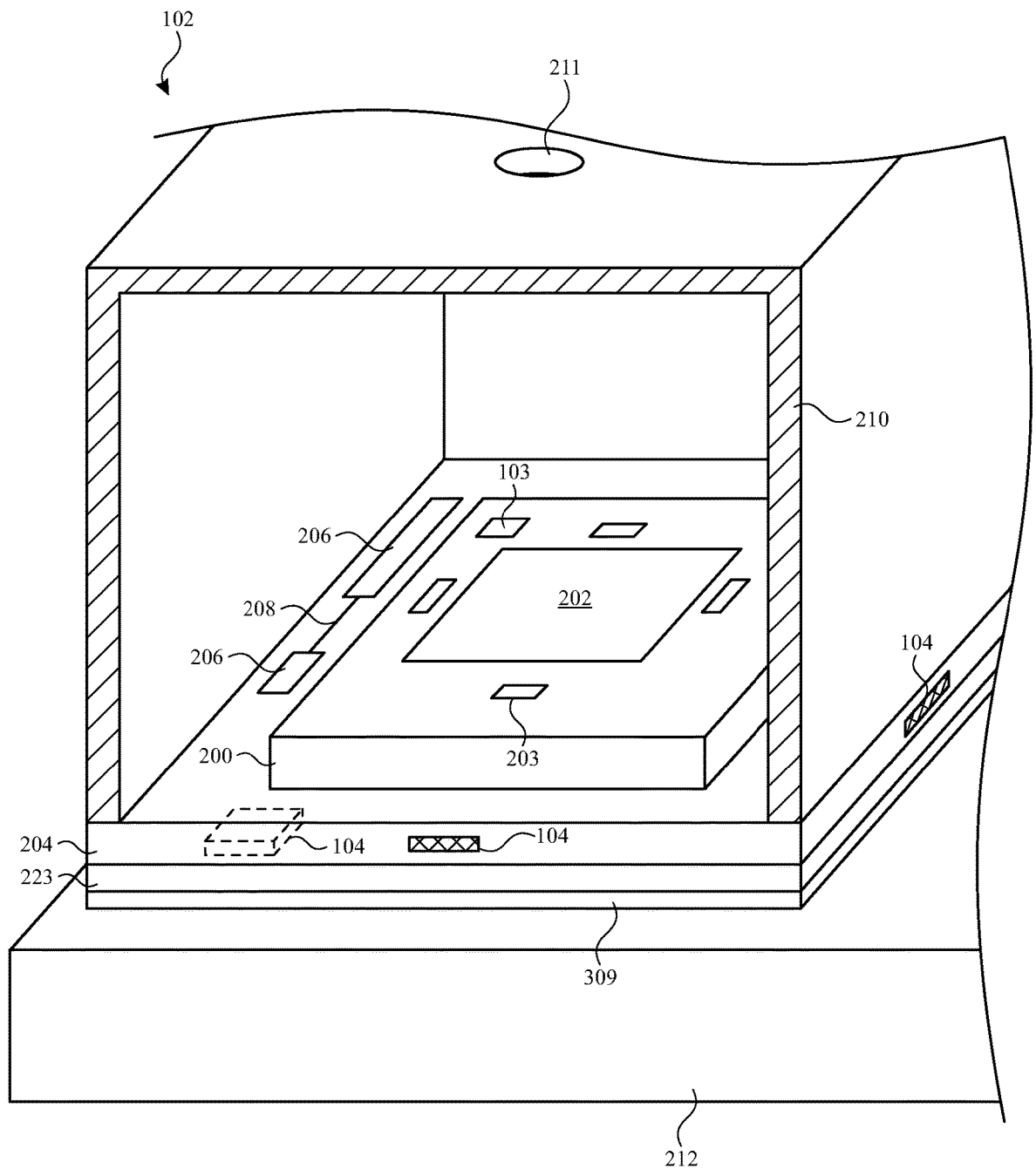
FIG. 3A illustrates a perspective view of a pressure sensor having a control circuitry substrate with a heater in accordance with various aspects of the subject technology.

FIG. 3A shows another arrangement of pressure sensor 102 in which heating elements 104 are disposed on or within sensor circuitry substrate (e.g., ASIC) 204, rather than on or within pressure sensing element 200. In the arrangement of FIG. 3A, even heating of pressure sensing element 200 may be achieved with fewer heating elements than in the arrangement of FIG. 2. Even heating of pressure sensing element 200 may enhance the accuracy of temperature measurements using temperature sensor 103. In the example of FIG. 3A, a thermally insulating layer 309 is formed between sensor circuitry substrate 204 and printed circuit 212. Integrated circuit elements 206 of pressure sensor 102 may operate heating elements 104 that are disposed on or within sensor circuitry substrate 204 for sensor testing, sensor calibration, or other pressure sensor operations as described in further detail hereinafter.

Figure 3B:
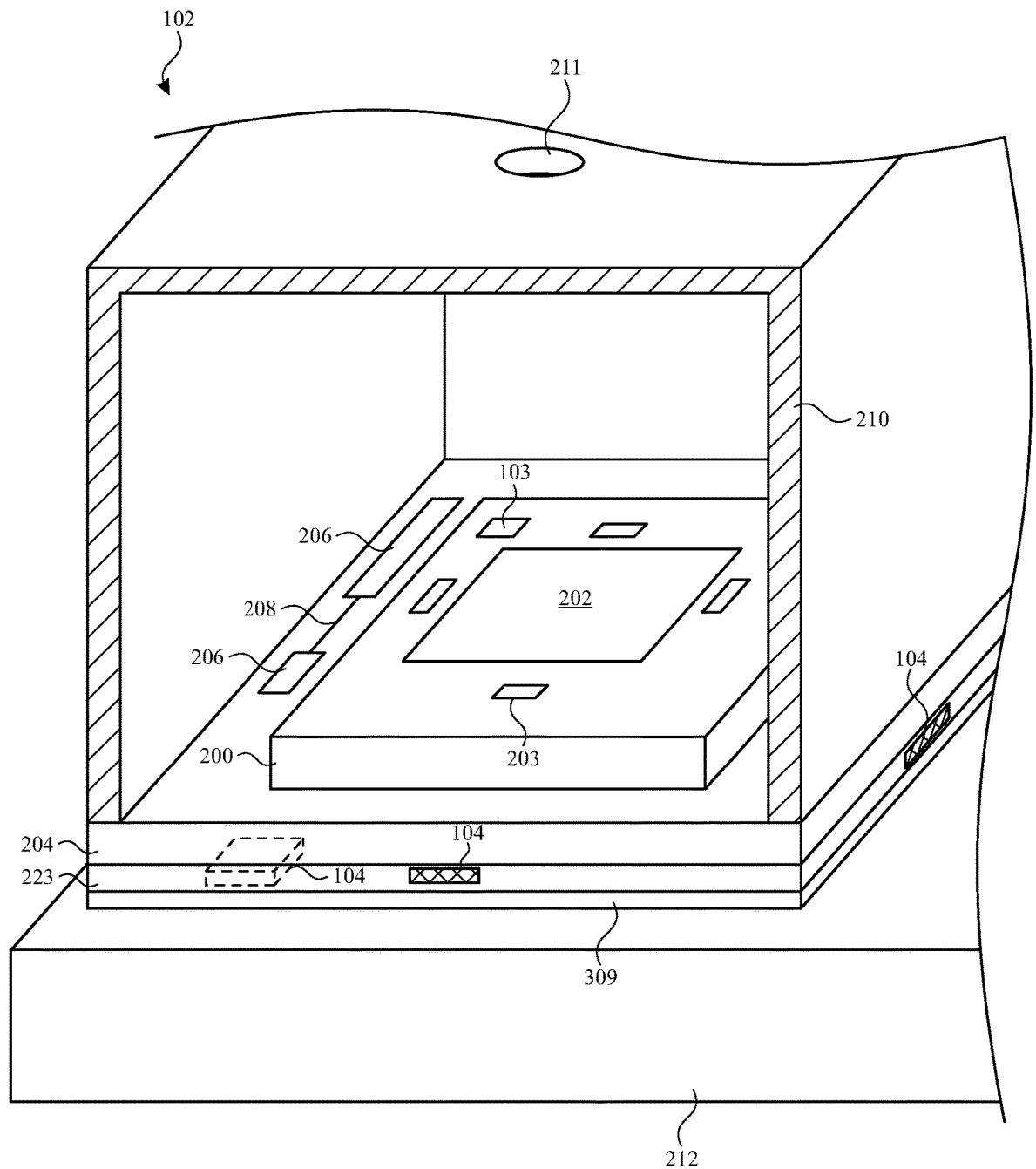
FIG. 3B illustrates a perspective view of a pressure sensor having a support substrate with a heater in accordance with various aspects of the subject technology.

FIG. 3B shows another arrangement of pressure sensor 102 in which heating elements 104 are disposed on or within substrate 223. In the arrangement of FIG. 3B, heating elements in substrate 223 are controlled by processing circuitry 206 of ASIC 204.

Figure 4:
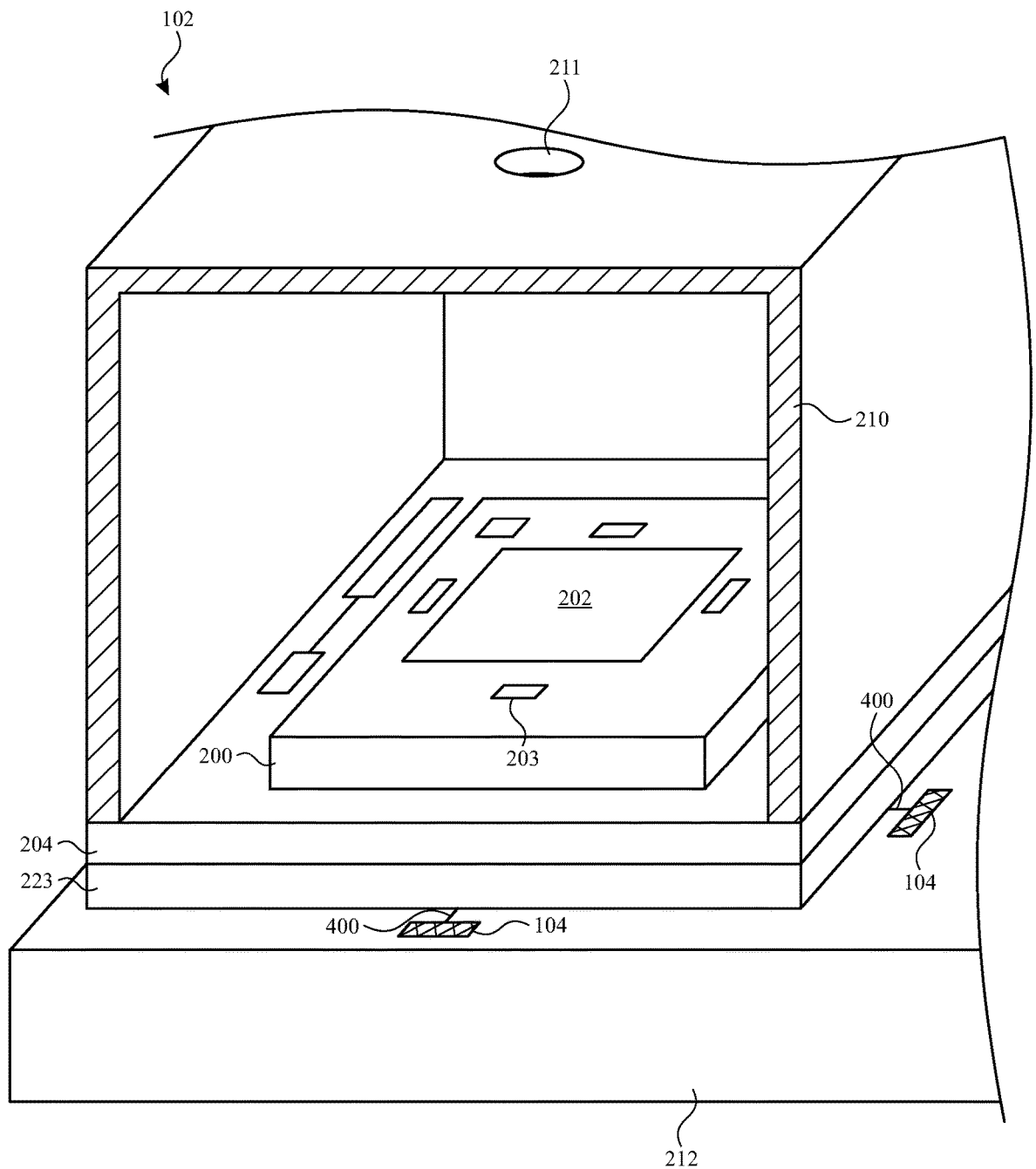
FIG. 4 illustrates a perspective view of a pressure sensor having an external heater in accordance with various aspects of the subject technology.

FIG. 4 shows another arrangement of pressure sensor 102 in which heating elements 104 are external to pressure sensor 102. In the particular example of FIG. 4, heating elements 104 are disposed on or within printed circuit 212. Heating elements 104 may be communicatively coupled to integrated circuit elements 206 via traces 400 on or within printed circuit 212.

Figure 5:
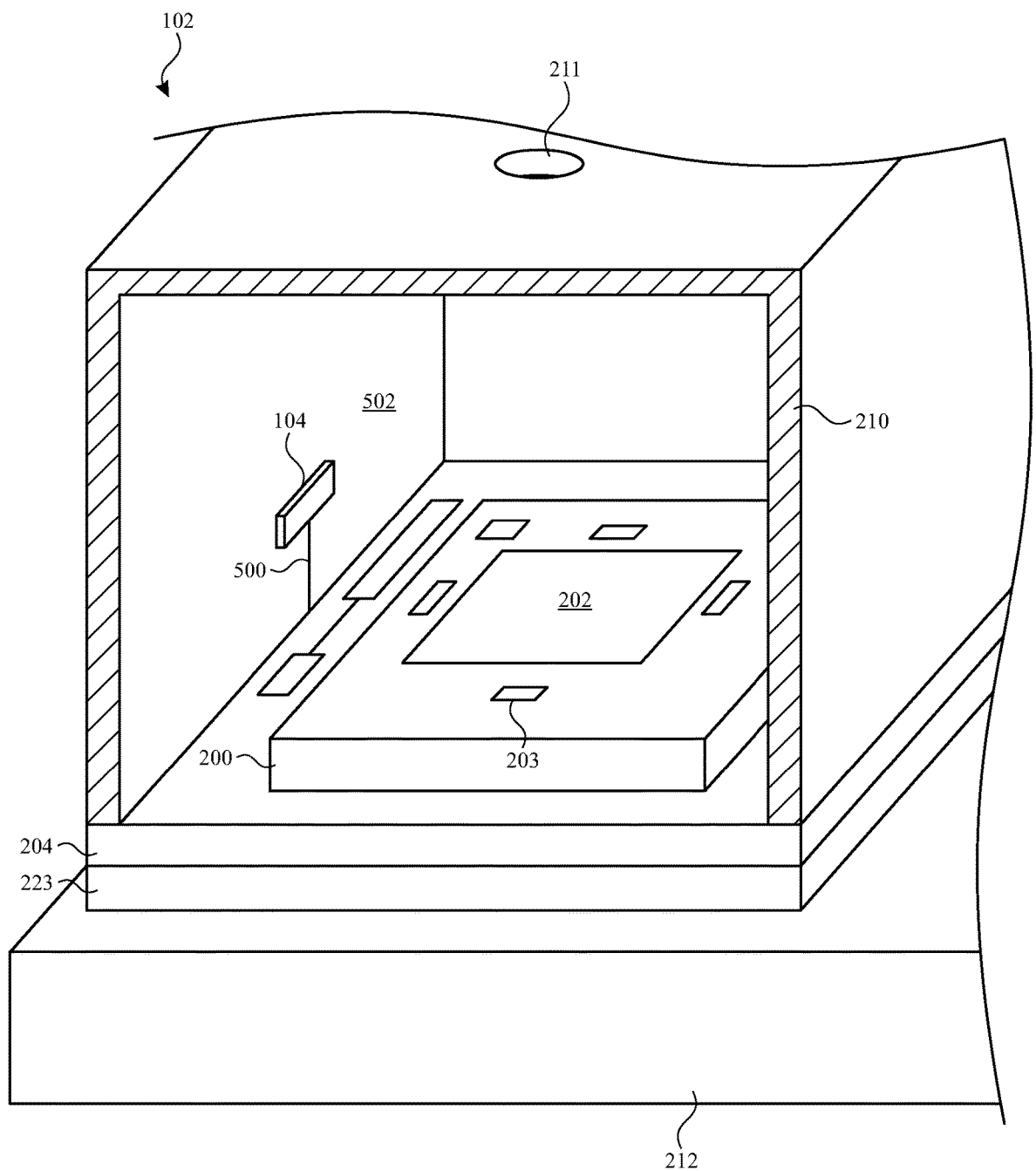
FIG. 5 illustrates a perspective view of a pressure sensor having heater disposed in a pressure sensor housing in accordance with various aspects of the subject technology.

FIG. 5 shows another arrangement of pressure sensor 102 in which a heating element 104 is separated from the sensing element of pressure sensor 102. In the particular example of FIG. 5, heating element 104 is disposed on an internal surface 502 of housing 210. However, it should also be appreciated that one or more heating elements may be formed on an outer surface of housing 210 and/or partially or completely embedded within housing 210 (e.g., within a sidewall or top wall of housing 210). For example, housing 210 may include a heating component embedded within the material(s) that forms housing 210 (e.g., and formed from a different material from the housing) or heating element 104 may be a resistive element that is integrally formed with the housing. Heating elements 104 on a surface of housing 210, or elsewhere within housing 210 or in the cavity enclosed by housing 210, may be communicatively coupled to integrated circuit elements 206 via one or more conductive lines (or traces) 500 that run, for example, along the surface of, or within the material of, housing 210.

Integrated circuit elements 206 of pressure sensor 102 may operate heating elements 104 that are disposed externally to or otherwise separated from sensor 102 (e.g., on or within printed circuit 212 and/or on or within housing 210) for sensor testing, sensor calibration, or other pressure sensor operations as described in further detail hereinafter.

Figure 6:
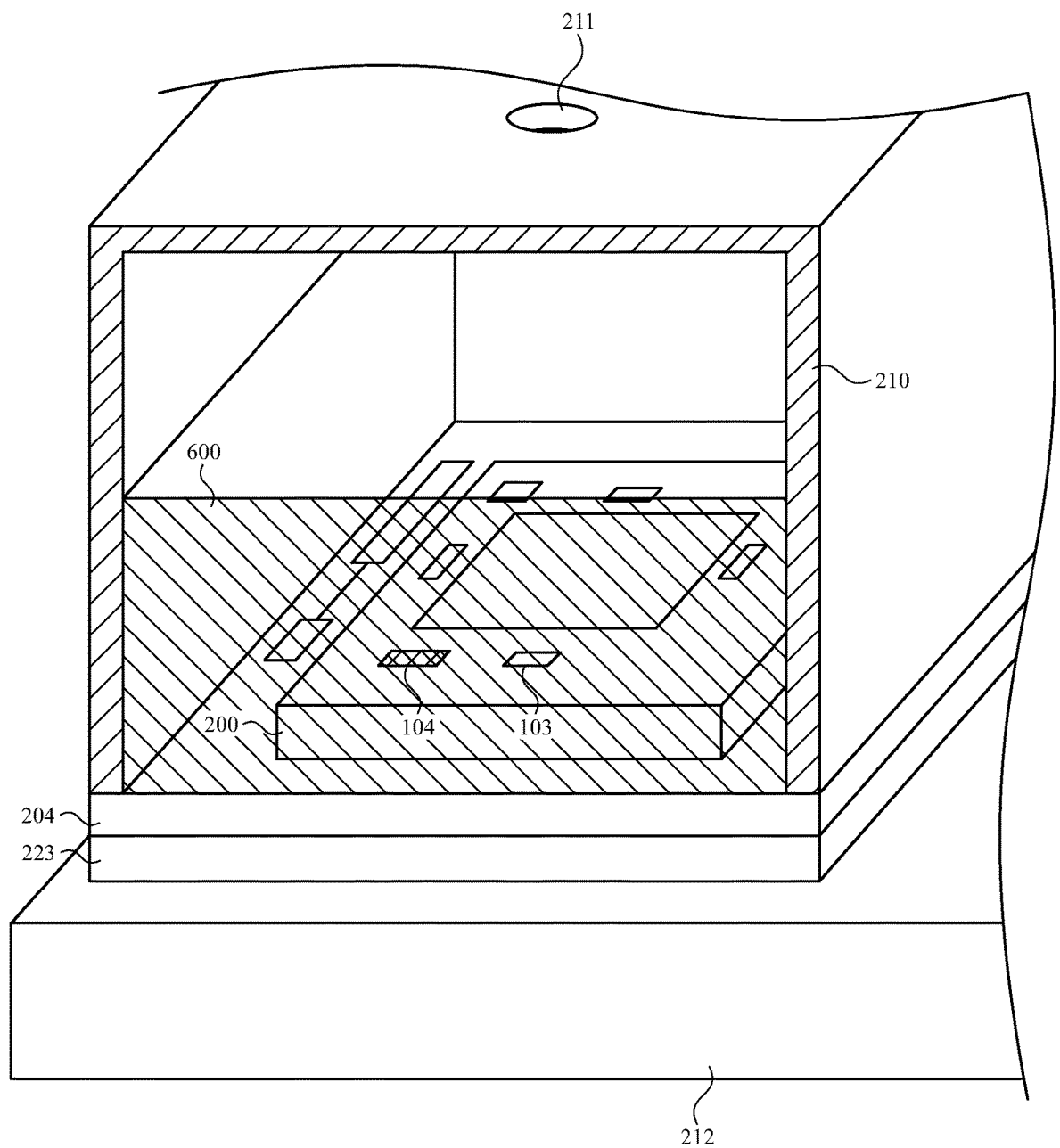
FIG. 6 illustrates a perspective view of a water-resistant pressure sensor having a heater in accordance with various aspects of the subject technology.

In some implementations, pressure sensor 102 may be implemented with water-resistant or water-proofing features. For example, FIG. 6 shows another arrangement of pressure sensor 102 in which the pressure sensor is provided with heating elements 104 on or within pressure sensing element 200 and with a water-resistant encapsulation 600 over the pressure sensing element and the pressure sensor circuitry. Water-resistant encapsulation 600 may be a waterproofing gel that prevents moisture, liquid, or other environmental aggressors from contacting the pressure sensing element and the pressure sensor circuitry. Heating elements 104 disposed on or within pressure sensing element 200 as in the example of FIG. 6, or disposed on or within sensor circuitry substrate 204 and/or substrate 223, printed circuit 212, and/or housing 210 may be operated to heat pressure sensing element 200, substrate 204, substrate 223, printed circuit 212 and/or water-resistant encapsulation 600 as desired for pressure sensor testing, calibration, and/or pressure-sensing operations.

Although FIG. 6 shows water-resistant features of a pressure sensor having heating elements 104, in which the water-resistant features are implemented as a water-resistant encapsulation 600 that is disposed within housing 210 and over the pressure sensing element and the pressure sensor circuitry, other water-resistant features are contemplated. For example, in some implementations, the pressure sensor 102 of any of FIGS. 2-6 may be provided with a cover (not explicitly shown) that spans port 211, the cover being formed from a material that allows air to pass through the cover, but resists passage of moisture such as water through the cover. For example, the cover for port 211 may be an air-permeable, water-resistant membrane (e.g., a polytetrafluoroethylene membrane) that allows air to pass through the membrane when the membrane is dry and prevents moisture from passing through the membrane (e.g., when the membrane is wet).

Figure 7:
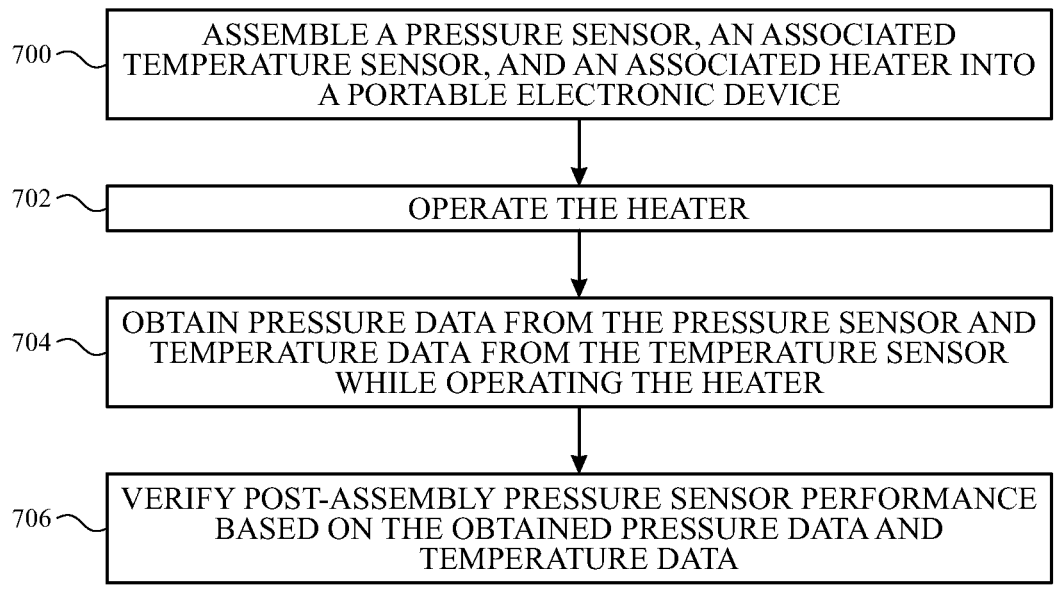
FIG. 7 illustrates a flow chart of an example process for in situ testing of a pressure sensor in a portable electronic device in accordance with various aspects of the subject technology.

FIG. 7 depicts a flow diagram of an example process for pressure sensor testing using an associated heater (e.g., testing in situ within an assembled device), in accordance with various aspects of the subject technology. For explanatory purposes, the example process of FIG. 7 is described herein with reference to the components of FIGS. 1-6. Further for explanatory purposes, some blocks of the example process of FIG. 7 are described herein as occurring in series, or linearly. However, multiple blocks of the example process of FIG. 7 may occur in parallel. In addition, the blocks of the example process of FIG. 7 need not be performed in the order shown and/or one or more of the blocks of the example process of FIG. 7 need not be performed.

In the depicted example flow diagram, at block 700, a pressure sensor such as pressure sensor 102 as described herein, an associated temperature sensor (e.g., temperature sensor 103), and an associated heater (e.g., heating element 104) are assembled into a portable electronic device such as device 100 of FIG. 1A (e.g., in to a housing enclosure for the device). The temperature dependence of pressure data from the pressure sensor may have been previously calibrated during manufacturing of the pressure sensor. For example, pressure measurements at each of several known temperatures of the pressure sensing element of the pressure sensor may have been obtained and stored (e.g., on the device or external to the device) during manufacturing of the sensor.

However, the processes of assembling the pressure sensor into the portable electronic device can damage the sensor and/or change the temperature response of the sensor. The pressure sensor 102 having an associated heater 104 and temperature sensor 103 as described herein can perform a self-verification after assembly into the device, using the operations described below in connection with blocks 700-706 to screen for such damage or changes to the sensor.

At block 702, the heater is operated. Operating the heater may include (e.g., using system processing circuitry 128 and/or integrated circuit elements 206 of pressure sensor ASIC 204) running a current through one or more resistive heating elements to heat pressure sensing element 200, substrate 204, substrate 223, and/or other portions of pressure sensor 102. Operating the heater may include increasing the temperature of one or more heating elements, decreasing the temperature of one or more heating elements, and/or maintaining the temperature of one or more heating elements for one or more predetermined time periods. Operating the heater may include operating the heater in cooperation with feedback from temperature sensor 103 to heat pressure sensing element 200 to one or more known temperatures (e.g., by increasing, decreasing, or holding the temperature of pressure sensing element 200 for one or more predetermined amounts of time).

At block 704, pressure data from the pressure sensor and temperature data from the temperature sensor are obtained while operating the heater. In this way, pressure measurements are obtained at at least one known temperature of the pressure sensing element.

At block 706, the post-assembly pressure sensor performance is verified based on the obtained pressure data and temperature data. For example, the pressure measurements at the known temperature(s) obtained by the assembled sensor can be compared to pressure measurements at the known temperature(s) obtained prior to assembly (e.g., during manufacturing of the sensor). If the pressure measurements at the known temperatures after assembly are the same as or similar to the pressure measurements at the same temperatures during manufacturing (e.g., within a predetermined range), the assembled sensor may be verified.

If the pressure measurements at the known temperatures after assembly are different from the pressure measurements at the same temperatures during manufacturing (e.g., the post-assembly measurements are outside of the predetermined range), the assembled sensor may be determined to be damaged or additional testing can be performed. Devices with damaged sensors after assembly can be returned to a previous assembly stage for removal and replacement of the damaged sensor (for example). In this way, assembly damage to pressure sensors may be detected and/or mitigated, without an external heating apparatus for the device, which can save both manufacturing time and costs for device 100.

Figure 8:
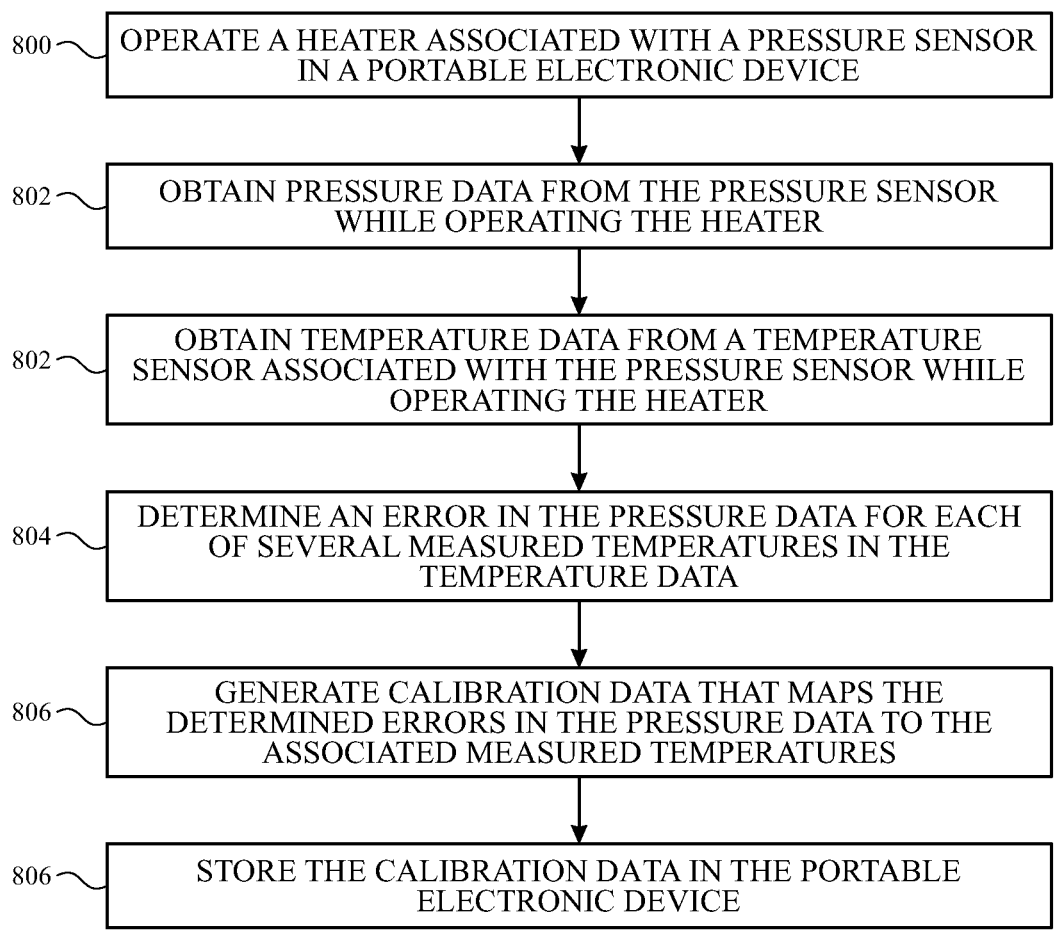
FIG. 8 illustrates a flow chart of an example process for in situ calibration of a pressure sensor in a portable electronic device in accordance with various aspects of the subject technology.

FIG. 8 depicts a flow diagram of an example process for pressure sensor calibration using an associated heater (e.g., in situ calibration of a sensor in a user-owned and operated device), in accordance with various aspects of the subject technology. For explanatory purposes, the example process of FIG. 8 is described herein with reference to the components of FIGS. 1-6. Further for explanatory purposes, some blocks of the example process of FIG. 8 are described herein as occurring in series, or linearly. However, multiple blocks of the example process of FIG. 8 may occur in parallel. In addition, the blocks of the example process of FIG. 8 need not be performed in the order shown and/or one or more of the blocks of the example process of FIG. 8 need not be performed.

In the depicted example flow diagram, at block 800, a heater such as heater 104 associated with a pressure sensor such as pressure sensor 102 in a portable electronic device such as device 100 of FIG. 1A is operated. Operating the heater may include (e.g., using system processing circuitry 128 and/or integrated circuit elements 206 of pressure sensor ASIC 204) running a current through one or more resistive heating elements to heat pressure sensing element 200, substrate 204, substrate 223, and/or other portions of pressure sensor 102. Operating the heater may include increasing the temperature of one or more heating elements, decreasing the temperature of one or more heating elements, and/or maintaining the temperature of one or more heating elements for one or more predetermined time periods. Operating the heater may include operating the heater in cooperation with feedback from temperature sensor 103 to heat pressure sensing element 200 to one or more known temperatures (e.g., by increasing, decreasing, or holding the temperature of pressure sensing element 200 for one or more predetermined amounts of time).

At block 802, pressure data from the pressure sensor is obtained while operating the heater.

At block 804, temperature data from a temperature sensor such as temperature sensor 103 associated with the pressure sensor is obtained while operating the heater.

At block 806, an error in the pressure data (e.g., a standard deviation, a variance, or another statistical measure of pressure data error) is computed for each of several measured temperatures in the temperature data.

At block 808, calibration data is generated for the pressure sensor that maps the determined errors in the pressure data to the associated measured temperatures.

At block 810, the calibration data is stored in the portable electronic device (e.g., using system processing circuitry 128 and memory 130 and/or integrated circuit elements 206 of pressure sensor ASIC 204).

Figure 9:
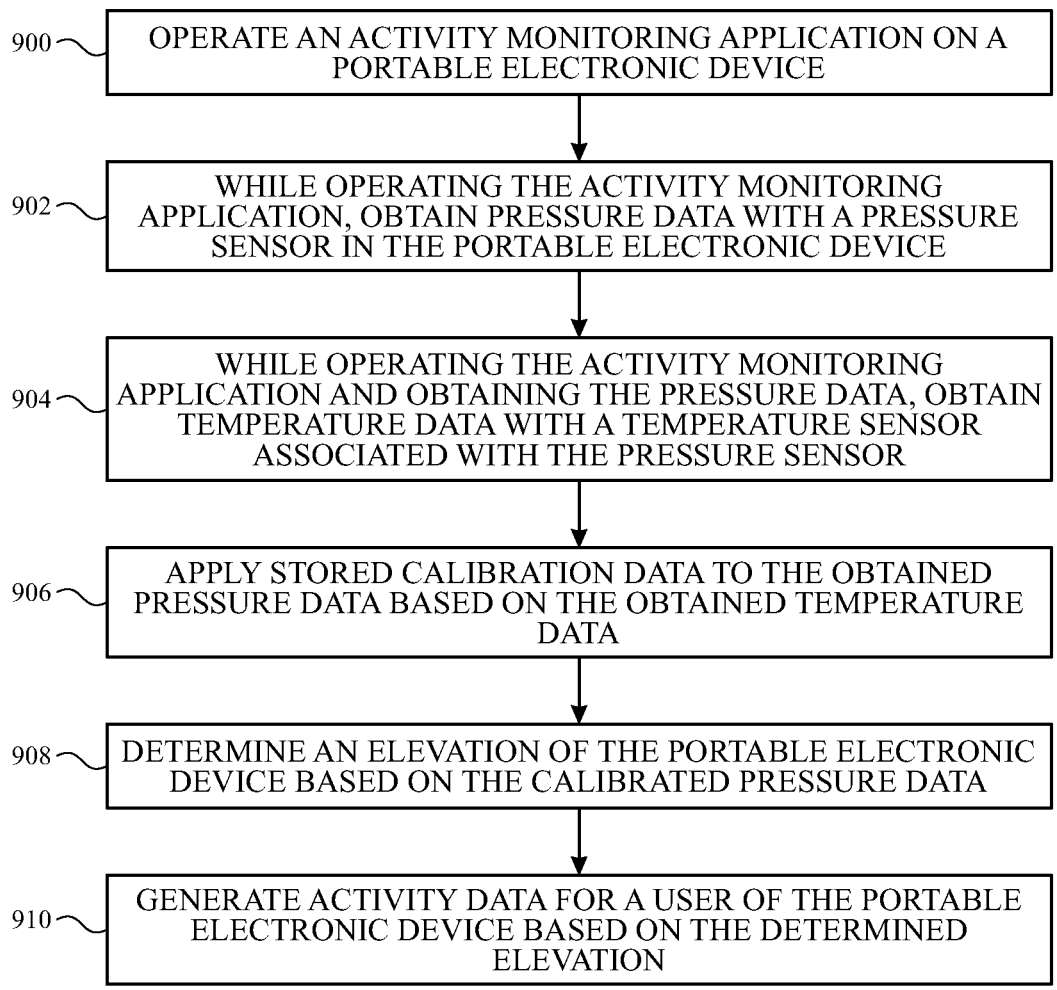
FIG. 9 illustrates a flow chart of an example process for operation of a temperature-calibrated pressure sensor in a portable electronic device in accordance with various aspects of the subject technology.

FIG. 9 depicts a flow diagram of an example process for operation of an electronic device having a temperature-calibrated pressure sensor and an associated temperature sensor, in accordance with various aspects of the subject technology. For explanatory purposes, the example process of FIG. 9 is described herein with reference to the components of FIGS. 1-6. Further for explanatory purposes, some blocks of the example process of FIG. 9 are described herein as occurring in series, or linearly. However, multiple blocks of the example process of FIG. 9 may occur in parallel. In addition, the blocks of the example process of FIG. 9 need not be performed in the order shown and/or one or more of the blocks of the example process of FIG. 9 need not be performed.

In the depicted example flow diagram, at block 900, an activity monitoring application on a portable electronic device such as device 100 of FIG. 1A is operated. Operating the activity monitoring application may include monitoring an activity of a user of the device with the activity monitoring application (e.g., by monitoring the motion, elevation, acceleration, and/or position of device 100 using various sensors within the device).

At block 902, while operating the activity monitoring application, pressure data is obtained with a pressure sensor such as pressure sensor 102 in the portable electronic device.

At block 904, while operating the activity monitoring application and obtaining the pressure data, temperature data is obtained with a temperature sensor such as temperature sensor 103 associated with the pressure sensor.

At block 906, stored calibration data is applied to the obtained pressure data based on the obtained temperature data. The stored calibration data may have been generated and stored using the processes described above in connection with FIG. 8 using a heater in the device and associated with the pressure sensor. During the normal lifetime of the device, some or all of the operations of FIG. 8 may be repeated to update the calibration data to be applied to the pressure data used by the activity monitoring application. The stored calibration data may be stored by memory 130 of FIG. 1A or by memory formed by integrated circuit elements 206 at the pressure sensor.

At block 908, an elevation of the portable electronic device is determined based on the calibrated pressure data.

(e.g., by converting a barometric pressure measured by the pressure sensor and calibrated using the stored calibration data into a device elevation).

At block 910, activity data is generated for a user of the portable electronic device based on the determined elevation. For example, exercise data may be generated such that one or more flights of stairs may be awarded to a wearer of device 100 implemented as a smart watch, based on a change in elevation identified using the determined elevation.

Figure 10:
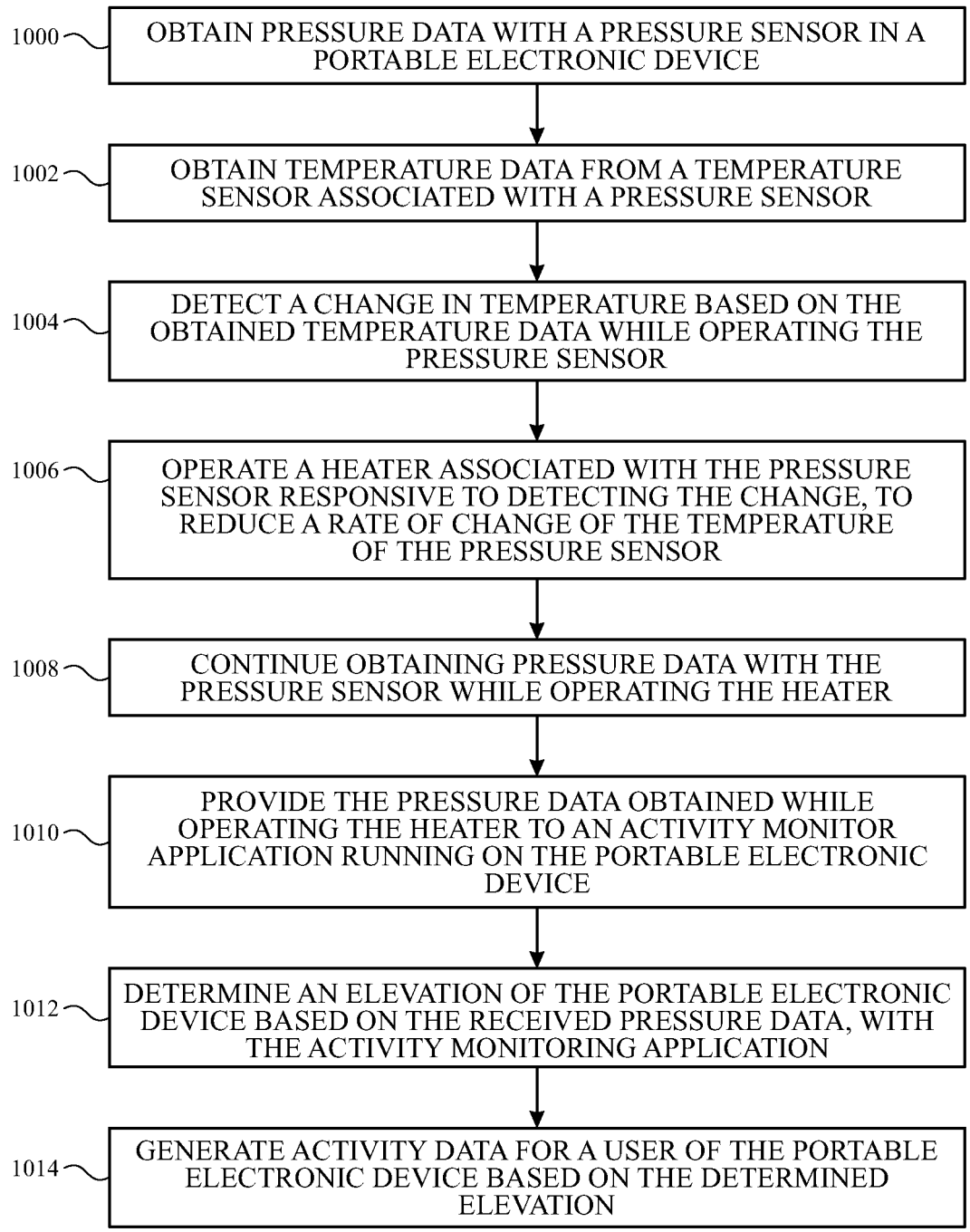
FIG. 10 illustrates a flow chart of an example process for operating a temperature-controlled pressure sensor in a portable electronic device in accordance with various aspects of the subject technology.

FIG. 10 depicts a flow diagram of an example process for temperature-controlled pressure sensor operation, in accordance with various aspects of the subject technology. For explanatory purposes, the example process of FIG. 10 is described herein with reference to the components of FIGS. 1-6. Further for explanatory purposes, some blocks of the example process of FIG. 10 are described herein as occurring in series, or linearly. However, multiple blocks of the example process of FIG. 10 may occur in parallel. In addition, the blocks of the example process of FIG. 10 need not be performed in the order shown and/or one or more of the blocks of the example process of FIG. 10 need not be performed.

In the depicted example flow diagram, at block 1000 pressure data is obtained with a pressure sensor such as pressure sensor 102 in a portable electronic device such as device 100. The pressure data may, for example, be obtained (e.g., using system processing circuitry 128 and/or integrated circuit elements 206 of pressure sensor ASIC 204) while operating an activity monitoring application for the device.

At block 1002, temperature data from a temperature sensor such as temperature sensor 103 associated with the pressure sensor is obtained.

At block 1004, a change in temperature is detected based on the temperature data obtained while operating the pressure sensor. The detected change in temperature may be caused by a change in the ambient temperature in the environment in which the device is embedded. The detected change may be a directly detected change in the ambient temperature or may be a detected resulting change in the temperature of sensor 102.

For example, if a user of device 100 carries (e.g., for a cellular telephone implementation) or wears (e.g., for a smart watch or other wearable device implementation) into or out of an building (e.g., a heated or air conditioned building) to an outdoor environment that is significantly cooler or hotter than the building environment, the ambient temperature can rapidly change by ten degrees, twenty degrees, thirty degrees, or more than thirty degrees (as examples). As another example, if a user of a smart watch places the smart watch on their wrist in a cold environment, the temperature of the smart watch can rapidly rise. These rapid changes in temperature can occur more quickly than, for example, a room heating up when the heater is turned on or cooling down when the air conditioner is turned on and, if care is not taken, can cause changes in pressure data from the pressure sensor that can be mistaken for real changes in pressure.

At block 1006, one or more heating elements such as heater 104 associated with the pressure sensor is operated responsive to detecting the change in temperature. Operating the heater may include (e.g., using system processing circuitry 128 and/or integrated circuit elements 206 of pressure sensor ASIC 204) running a current through one or more resistive heating elements to heat pressure sensing element 200, substrate 204, substrate 223, and/or other portions of pressure sensor 102 (e.g., in combination with temperature feedback from temperature sensor 103) to prevent a rapid fall in ambient temperature from causing an associated rapid fall in the temperature of the pressure sensor. Operating the heater may include allowing the temperature of the pressure sensor to fall (e.g., to the new ambient temperature), but at a reduced rate of change to prevent the pressure data changes associated with the temperature fall from being mistaken for a change in pressure and/or elevation Although heater 104 has been described in various examples as providing only heating operations for pressure sensor 102, in some implementations element 104 may be implemented as a more general temperature control element that provides heating and/or cooling for pressure sensor 102. For example, in some implementations, heater 104 may be implemented as a heating and/or cooling element such as a Peltier junction that can, in addition to providing heat, be operated at block 1006 to cool pressure sensing element 200, substrate 204, substrate 223, and/or other portions of pressure sensor 102 to prevent a rapid rise in sensor temperature that could be mistaken for a change in pressure and/or elevation.

At block 1008, pressure data is obtained with the pressure sensor while operating the heater to slow the effect of the detected temperature change on the pressure sensor.

At block 1010, the pressure data obtained while operating the heater may be provided to an activity monitor application running on the portable electronic device.

At block 1012, an elevation of the portable electronic device is determined based on the received pressure data, with the activity monitoring application. Determining the elevation may include identifying a change in the elevation based on a change in the pressure sensor data that is faster than the change allowed in the temperature of the sensor by the heater/cooler.

At block 1014, activity data is generated for a user of the portable electronic device based on the determined elevation. For example, one or more flights of stairs may be awarded to a wearer of device 100 implemented as a smart watch, based on a change in elevation identified using the determined elevation.

In accordance with various aspects of the subject disclosure, a portable electronic device is provided that includes a pressure sensor, a heating element associated with the pressure sensor, and processing circuitry. The processing circuitry is configured to heat the pressure sensor with the heating element. The processing circuitry is also configured to obtain pressure sensor data from the pressure sensor while heating the pressure sensor with the heating element.

In accordance with other aspects of the subject disclosure, a portable electronic device is provided that includes a pressure sensor. The pressure sensor includes a pressure sensing element and a heating element integrated with the pressure sensing element.

In accordance with other aspects of the subject disclosure, a method is provided that includes detecting, with a temperature sensor in a portable electronic device, a change in a temperature of a pressure sensor in the portable electronic device. The method also includes operating a temperature control element in the portable electronic device, responsive to detecting the change in the temperature. The operating the temperature control element comprises controlling a rate of change of the temperature of the pressure sensor.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A portable electronic device, comprising:
   a pressure sensor comprising a resistive element on a semiconductor die;
   a heating element associated with the pressure sensor; and
   processing circuitry configured to:
      heat the pressure sensor with the heating element;
      obtain pressure sensor data from the pressure sensor while heating the pressure sensor with the heating element; and
      determine exercise data for a user of the portable electronic device by identifying a change in elevation based on the obtained pressure sensor data,
   wherein:
   the processing circuitry is disposed on a sensor circuitry substrate of the pressure sensor.

2. The portable electronic device of claim 1, further comprising a temperature sensor associated with the pressure sensor, and wherein the processing circuitry is further configured to:

obtain temperature data from the temperature sensor;
detect a change in a temperature of the pressure sensor as indicated by a corresponding change in the obtained temperature data; and
heat the pressure sensor with the heating element responsive to the detected change in temperature.

3. The portable electronic device of claim 2, wherein the processing circuitry is further configured to heat the pressure sensor with the heating element responsive to the detected change in temperature to control a rate of a decrease of the temperature of the pressure sensor.

4. The portable electronic device of claim 1, further comprising a temperature sensor associated with the pressure sensor, and wherein the processing circuitry is further configured to:
determine an error associated with each of several pressure measurements in the pressure sensor data obtained while heating the pressure sensor; and
obtain a temperature measurement associated with each of the several pressure measurements while heating the pressure sensor.

5. The portable electronic device of claim 4, wherein the processing circuitry is further configured to generate calibration data that maps the determined errors associated with each of the several pressure measurement to the associated obtained temperatures.

6. The portable electronic device of claim 1, further comprising a temperature sensor associated with the pressure sensor, and wherein the processing circuitry is further configured to:
heat the pressure sensor with the heating element, using temperature feedback from the temperature sensor, according to a previous heating of the pressure sensor at a time prior to assembly of the pressure sensor into the portable electronic device; and
compare the obtained pressure sensor data to stored pressure sensor data obtained during the previous heating of the pressure sensor at the time prior to assembly of the pressure sensor into the portable electronic device.

7. The portable electronic device of claim 1, wherein the pressure sensor comprises:
a pressure sensing element mechanically and electrically coupled to the sensor circuitry substrate.

8. The portable electronic device of claim 7, wherein the heating element is integrated with the pressure sensing element.

9. The portable electronic device of claim 7, wherein the heating element is formed on or within the sensor circuitry substrate.

10. The portable electronic device of claim 7, further comprising a support substrate coupled to the sensor circuitry substrate, wherein the heating element is formed on or within the support substrate.

11. The portable electronic device of claim 7, further comprising a printed circuit communicatively coupled between the pressure sensor and system circuitry for the portable electronic device, wherein the pressure sensor is mounted on the printed circuit and wherein the heating element is disposed on the printed circuit.

12. The portable electronic device of claim 11, wherein the processing circuitry for the pressure sensor is the processing circuitry that is configured to operate the heating element.

13. The portable electronic device of claim 11, further comprising a temperature sensor associated with the pressure sensor, wherein the system circuitry for the portable electronic device is the processing circuitry that is configured to operate the heating element, and wherein the system circuitry is configured to operate the heating element to control a temperature of the pressure sensor using temperature feedback data from the temperature sensor.

14. The portable electronic device of claim 13, wherein the temperature sensor is thermally coupled to a pressure sensing element of the pressure sensor.

15. The portable electronic device of claim 1, wherein the pressure sensor comprises a housing and wherein the heating element is mounted on the pressure sensor housing.

16. The portable electronic device of claim 1, wherein the pressure sensor comprises a housing and wherein the heating element is mounted in the pressure sensor housing, wherein the pressure sensor housing, wherein the pressure sensor housing is further encapsulated to protect the pressure sensor and the heating element from moisture.

17. A portable electronic device, comprising
a pressure sensor, comprising:
a pressure sensing element comprising a resistive element on a semiconductor die;
a heating element integrated with the pressure sensing element; and
processing circuitry configured to obtain pressure sensor data and determine exercise data for a user of the portable electronic device by identifying a change in elevation based on the obtained pressure sensor data, wherein the processing circuitry is disposed on a sensor circuitry substrate of the pressure sensor.

18. The portable electronic device of claim 17, wherein the pressure sensing element has a pressure sensing membrane and one or more sensing elements on the semiconductor die to sense deformations of the pressure sensing membrane due to changes in ambient pressure.

19. The portable electronic device of claim 18, wherein the pressure sensor further comprises a temperature sensor on the semiconductor die.

20. The portable electronic device of claim 19, wherein the pressure sensor further comprises an application specific integrated circuit communicatively coupled to the pressure sensing element, the application specific integrated circuit formed on a substrate.

21. The portable electronic device of claim 20, further comprising a thermal insulating layer disposed between the pressure sensing element and the substrate.

22. A method, comprising:
obtaining pressure sensor data from a pressure sensor of a portable electronic device, the pressure sensor comprising a resistive element on a semiconductor die;
heating the pressure sensor with the heating element;
detecting, by a temperature sensor of the portable electronic device, a change in a temperature of the pressure sensor;
operating a temperature control element, responsive to detecting the change in the temperature, wherein operating the temperature control element comprises controlling a rate of change of the temperature of the pressure sensor; and
determining exercise data for a user of the portable electronic device by identifying a change in elevation indicated by the obtained pressure sensor data.

23. The method of claim 22, wherein the temperature control element is a resistive heating element and is configured to control a rate of change of the temperature of the pressure sensor by operating the resistive heating element to slow a fall in the temperature of the pressure sensor.

24. The method of claim 23, wherein the temperature control element is a cooling element and wherein controlling the rate of change of the temperature of the pressure sensor comprises operating the cooling element to slow a rise in the temperature of the pressure sensor.

25. The method of claim 22, further comprising:
obtaining pressure sensor data from the pressure sensor while controlling the rate of change of the temperature of the pressure sensor; and
providing the pressure sensor data to an activity monitoring application of the portable electronic device.

* * * * *

UNITED STATES PATENT AND TRADEMARK OFFICE
CERTIFICATE OF CORRECTION

PATENT NO. : 11,054,329 B2
APPLICATION NO. : 16/012700
DATED : July 6, 2021
INVENTOR(S) : David MacNeil et al.

It is certified that error appears in the above-identified patent and that said Letters Patent is hereby corrected as shown below:

In the Claims

Column 15, Line 25 (Claim 5), Replace "measurement" with --measurements--;

Column 16, Lines 15-16 (Claim 16), Remove "wherein the pressure sensor housing,".

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*